United States Patent
Elhamias et al.

(10) Patent No.: US 12,061,805 B2
(45) Date of Patent: *Aug. 13, 2024

(54) SYSTEMS AND METHODS FOR DYNAMICALLY REDUCING ACCESS TIME OF STORAGE DEVICE SYSTEM BASED ON PATTERN RECOGNITION

(71) Applicant: SanDisk Technologies LLC, Addison, TX (US)

(72) Inventors: Reuven Elhamias, Kfar Vradim (IL); Ram Fishler, M.P. Misgav (IL)

(73) Assignee: SanDisk Technologies LLC, Austin, TX (US)

( * ) Notice: Subject to any disclaimer, the term of this patent is extended or adjusted under 35 U.S.C. 154(b) by 315 days.

This patent is subject to a terminal disclaimer.

(21) Appl. No.: 17/483,470

(22) Filed: Sep. 23, 2021

(65) Prior Publication Data
US 2022/0011952 A1 Jan. 13, 2022

Related U.S. Application Data

(63) Continuation of application No. 16/455,640, filed on Jun. 27, 2019, now Pat. No. 11,157,182, which is a
(Continued)

(51) Int. Cl.
*G06F 3/06* (2006.01)
*G06F 12/02* (2006.01)

(52) U.S. Cl.
CPC .......... *G06F 3/0625* (2013.01); *G06F 3/0634* (2013.01); *G06F 3/0659* (2013.01);
(Continued)

(58) Field of Classification Search
CPC .... G06F 3/0625; G06F 3/0634; G06F 3/0659; G06F 3/0679; G06F 12/0246; G06F 2212/1028; Y02D 10/00
See application file for complete search history.

(56) References Cited

U.S. PATENT DOCUMENTS 5,172,338 A 12/1992 Mehrotra et al.
5,260,555 A 11/1993 Sakamoto
(Continued)

FOREIGN PATENT DOCUMENTS

JP H 09-081332 3/1997
JP H 09-330387 12/1997
(Continued)

OTHER PUBLICATIONS

Lexar Media, "Write Acceleration Technology for Digital Camera and Compact Flash," retrieved from www.digitalfilm.com/pdf/WA_shite_sheet.pdf on Sep. 30, 2003, 5 pages.
(Continued)

*Primary Examiner* — Charles Rones
*Assistant Examiner* — Han V Doan
(74) *Attorney, Agent, or Firm* — Morgan, Lewis & Bockius LLP

(57) ABSTRACT

A non-volatile memory system goes into a low-power standby sleep mode to reduce power consumption if a host command is not received within delay period. The duration of this delay period is adjustable. In one set of embodiments, host commands can specify the delay value, the operation types to which it applies, and whether the value is power the current power session or to be used to reset a default value as well. In other aspects, the parameters related to the delay value are kept in a host resettable parameter file. In other embodiments, the memory system monitors the time between host commands and adjusts this delay automatically.

20 Claims, 6 Drawing Sheets

Related U.S. Application Data continuation of application No. 14/798,199, filed on Jul. 13, 2015, now Pat. No. 10,365,841, which is a continuation of application No. 13/323,612, filed on Dec. 12, 2011, now abandoned.

(52) U.S. Cl.
CPC ........ *G06F 3/0679* (2013.01); *G06F 12/0246* (2013.01); *G06F 2212/1028* (2013.01); *Y02D 10/00* (2018.01)

(56) References Cited

U.S. PATENT DOCUMENTS

| | | | |
|---|---|---|---|
| 5,418,752 | A | 5/1995 | Harari et al. |
| 5,691,948 | A | 11/1997 | Sakabe |
| 5,694,356 | A | 12/1997 | Wong et al. |
| 5,784,599 | A | 7/1998 | Elkhoury |
| 5,838,950 | A | 11/1998 | Young et al. |
| 6,040,622 | A | 3/2000 | Wallace |
| 6,055,593 | A | 4/2000 | Shaberman et al. |
| 6,182,162 | B1 | 1/2001 | Estakhri et al. |
| 6,279,114 | B1 | 8/2001 | Toombs et al. |
| 6,327,639 | B1 | 12/2001 | Asnaashari |
| 6,381,405 | B1 | 4/2002 | Yamagishi |
| 6,385,667 | B1 | 5/2002 | Estakhri et al. |
| 6,721,854 | B1 | 4/2004 | Asano et al. |
| 6,820,148 | B1 | 11/2004 | Cedar et al. |
| 6,892,313 | B1 | 5/2005 | Codilian et al. |
| 6,901,457 | B1 | 5/2005 | Toombs et al. |
| 6,901,498 | B2 | 5/2005 | Conley |
| 6,925,007 | B2 | 8/2005 | Harari et al. |
| 6,941,403 | B2 | 9/2005 | Cedar et al. |
| 6,971,582 | B2 | 12/2005 | Kim |
| 7,107,420 | B2 | 9/2006 | Boyd et al. |
| 7,427,027 | B2 | 9/2008 | Elhamias et al. |
| 7,574,553 | B2 | 8/2009 | Squires et al. |
| 7,769,945 | B2 | 8/2010 | Lasser et al. |
| 7,821,864 | B2 | 8/2010 | Totolos, Jr. et al. |
| 7,926,720 | B2 | 4/2011 | Elhamias et al. |
| 2001/0036232 | A1 | 11/2001 | Betts |
| 2002/0013881 | A1 | 1/2002 | Delp et al. |
| 2002/0039325 | A1 | 4/2002 | Aziawa |
| 2002/0040412 | A1 | 4/2002 | Estakhri et al. |
| 2002/0112101 | A1 | 8/2002 | Estakhri et al. |
| 2002/0120797 | A1 | 8/2002 | Fabre |
| 2002/0169824 | A1 | 11/2002 | Dettinger |
| 2002/0194552 | A1 | 12/2002 | Sasssa et al. |
| 2003/0028699 | A1 | 2/2003 | Holtzman et al. |
| 2003/0131208 | A1 | 7/2003 | Toba |
| 2004/0158755 | A1 | 8/2004 | Mitsubori et al. |
| 2005/0086553 | A1 | 4/2005 | Spencer |
| 2005/0185463 | A1 | 8/2005 | Kanamori et al. |
| 2005/0251617 | A1 | 11/2005 | Sinclair et al. |
| 2006/0022054 | A1* | 2/2006 | Elhamias .............. G06F 3/0607 235/492 |
| 2006/0064532 | A1 | 3/2006 | Hur |
| 2007/0108293 | A1 | 5/2007 | Odate |
| 2008/0043562 | A1 | 2/2008 | Totolos et al. |
| 2008/0189452 | A1 | 8/2008 | Merry et al. |
| 2008/0270639 | A1 | 10/2008 | Elhamias et al. |
| 2009/0055670 | A1 | 2/2009 | Yamamoto |
| 2009/0325533 | A1 | 12/2009 | Lele |
| 2010/0205412 | A1 | 8/2010 | McLeod |
| 2010/0205462 | A1 | 8/2010 | Raushmayer et al. |
| 2010/0274962 | A1 | 10/2010 | Mosek et al. |
| 2011/0022859 | A1 | 1/2011 | More et al. |
| 2011/0099405 | A1 | 4/2011 | Voutilainen |
| 2011/0167186 | A1 | 7/2011 | Elhamias et al. |

FOREIGN PATENT DOCUMENTS

| | | |
|---|---|---|
| JP | H 10-170564 | 6/1998 |
| JP | 2000-181784 | 6/2000 |
| JP | 2001-297316 | 10/2001 |
| JP | 2003-036202 | 2/2003 |
| JP | 2003-036205 | 2/2003 |
| WO | WO 99/045460 | 9/1999 |

OTHER PUBLICATIONS

MMCA Technical Committee, "The MultiMediaCard System Summary Based on System Specification Version 2.2," Jan. 2000, pp. 2-27.

Non-final Office Action issued in U.S. Appl. No. 13/323,612, mailed Mar. 26, 2014, 24 pages.

Non-final Office Action issued in U.S. Appl. No. 13/323,612, mailed May 1, 2013, 22 pages.

Non-final Office Action issued in U.S. Appl. No. 13/323,612, mailed Nov. 19, 2013, 25 pages.

Final Office Action issued in U.S. Appl. No. 13/323,612, mailed Jan. 13, 2015, 17 pages.

\* cited by examiner

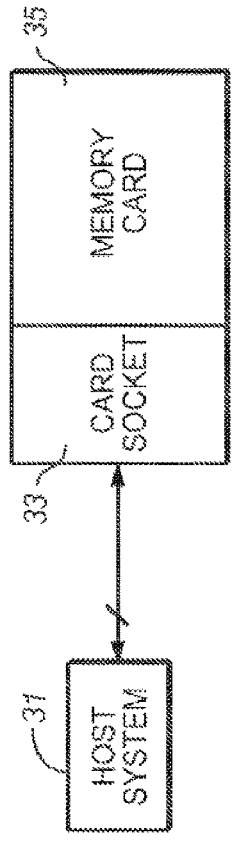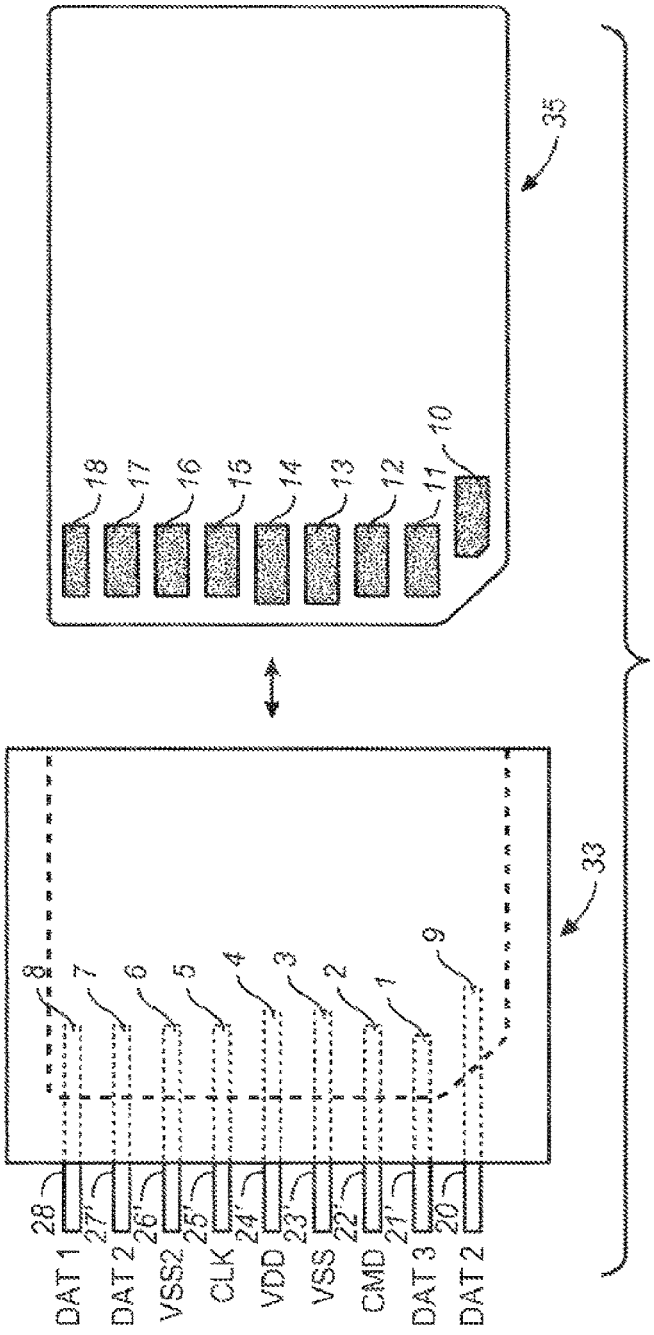

SYSTEMS AND METHODS FOR DYNAMICALLY REDUCING ACCESS TIME OF STORAGE DEVICE SYSTEM BASED ON PATTERN RECOGNITION

CROSS-REFERENCE TO RELATED APPLICATIONS

This application is a continuation of application Ser. No. 16/455,640, filed on Jun. 27, 2019, now U.S. Pat. No. 11,157,182, which is a continuation of application Ser. No. 14/798,199, filed on Jul. 13, 2015, now U.S. Pat. No. 10,365,841, which is a continuation of application Ser. No. 13/323,612, filed on Dec. 12, 2011, now abandoned, the entirety of each of which is incorporated herein by reference.

BACKGROUND OF THE INVENTION

This invention relates, generally, to non-volatile memory devices and, more specifically, to such device which optimize their behaviors based upon host behavior.

Various commercially available non-volatile memory cards that are becoming popular are extremely small and have different mechanical and/or electrical interfaces. Examples include the related MultiMediaCard ("MMC") and Secure Digital ("SD") memory cards that are available from SanDisk Corporation of Sunnyvale, California, assignee of the present application. There are other cards that conform to standards of the International Organization for Standardization ("ISO") and the International Electrotechnical Commission ("IEC"), an example that is widely implemented being known as the ISO/IEC 7816 standard.

The physical and electrical specifications for the MMC are given in "The MultiMediaCard System Specification" that is updated and published from time-to-time by the MultiMediaCard Association ("MMCA") of Cupertino, California. Versions 2.11 and 2.2 of that Specification, dated June 1999 and January 2000, respectively, are expressly incorporated herein by this reference. MMC products having varying storage capacity up to 64 megabytes in a single card are currently available from SanDisk Corporation, and capacities of 128 megabytes are expected to be available in the near future. These products are described in a "MultiMediaCard Product Manual," Revision 2, dated April 2000, published by SanDisk Corporation, which Manual is expressly incorporated herein by this reference. Certain aspects of the electrical operation of the MMC products are also described in co-pending patent applications of Thomas N. Toombs and Micky Holtzman, Ser. Nos. 09/185,649 and 09/186,064, both filed Nov. 4, 1998, and assigned to SanDisk Corporation. The physical card structure and a method of manufacturing it are described in U.S. Pat. No. 6,040,622, assigned to SanDisk Corporation. Both of these applications and patent are also expressly incorporated herein by this reference.

The newer SD Card is similar to the MMC card, having the same size except for an increased thickness that accommodates an additional memory chip. A primary difference between them is that the SD Card includes additional data contacts in order to enable faster data transfer between the card and a host. The other contacts of the SD Card are the same as those of the MMC card in order that sockets designed to accept the SD Card will also accept the MMC card. The electrical interface with the SD card is further made to be, for the most part, backward compatible with the MMC product described in version 2.11 of its specification referenced above, in order that few changes to the operation of the host need be made in order to accommodate both types of card. Certain aspects of the SD card are described in U.S. patent application Ser. No. 09/641,023, filed Aug. 17, 2000, which application is incorporated herein by this reference.

Cards made according to the ISO/IEC 7816 standard are of a different shape, have surface contacts in different positions, and a different electrical interface than the MMC and SD Cards. The ISO/IEC 7816 standard has the general title of "Identification cards—Integrated Circuit(s) Cards with Contacts," and consists of parts 1-10 that carry individual dates from 1994 through 2000. This standard, copies of which are available from the ISO/IEC in Geneva, Switzerland, is expressly incorporated herein by this reference. ISO/IEC 7816 cards are particularly useful in applications where data must be stored in a secure manner that makes it extremely difficult or impossible for the data to be read in an unauthorized manner. The small ISO/IEC 7816 cards are commonly used in cellular telephones, among other applications.

Current storage systems are designed to work with a number of different applications, such as audio storage, still image storage and video storage, but are generally not optimized for a particular application. The different hosts use memory cards in different applications. These applications have different needs in terms of read and write performance, level of data integrity, and so on. Such systems may operate well in one application, but fail to provide acceptable performance in another application. The differentiation in the applications needs is not taken into account in the card controller.

These removable non-volatile memory cards include a memory array and a controller that performs as the memory control and the host interface function. These removable cards are plugged into different a variety of devices, such as personal data assistants (PDAs), digital camera, cell phone, etc., which access the card in different patterns. This differentiation causes the card to have less than optimal performance and capability to optimize the memory management algorithms according to the host access pattern for the various applications. Although general performance enhancements, such as caching, may help in many applications, there will still be trade offs in a general-purpose card. Alternately, there may be specific optimizations for certain applications, but these need to be engineered into the card ahead of time.

SUMMARY OF THE INVENTION

According to a first set of aspects, a method is presented of operating a non-volatile memory system, where the memory system includes a non-volatile memory circuit and a controller circuit for managing data stored in the non-volatile memory circuit and the interactions between the memory system and a host to which the memory system is connected. The method includes, while connected to the host, operating of the memory system by the controller circuit in one of either a standard mode or a low-power standby mode. The memory system operates in the standard mode when executing host commands and, after executing a host command, lapsing from the standard mode into the low-power standby mode after a delay unless receiving a further command from the host prior to lapsing into the standby mode. In response to receiving a host command while in the standby mode, the memory system reverts to the standard mode. The method further includes, while connected to the host, operating the memory system according to a set of host commands, wherein the set of host commands includes one or more commands that specify a value for the delay subsequent to the execution of them.

According to other aspects, a non-volatile memory system comprises a non-volatile memory circuit and a controller circuit connected to non-volatile memory circuit. The controller circuit manages the transfer of data between the memory circuit and a host to which the memory system is connected and the storage of the data on the memory system. The controller circuit includes logic circuitry and a volatile random access memory. In response to the memory system not receiving a host command within in a period of time specified by a delay parameter, the controller places the memory system into a low-power standby mode. The controller maintains a first value for the delay parameter in the non-volatile memory circuit, and the controller resets the value of the delay parameter in response to a command that specifies a value for the delay parameter different than the first value.

Further aspects include a method of operating a non-volatile memory system, the memory system including a non-volatile memory circuit and a controller circuit for managing data stored in the non-volatile memory circuit and the interactions between the memory system and a host to which the memory system is connected. The controller circuit operates the memory system in one of either a standard mode or a low-power standby mode, and the memory system executes commands from the host in the standard mode and lapses from the standard mode into the low-power standby mode after a delay value unless receiving a further command from the host prior to lapsing into the standby mode. The method includes monitoring by the controller of a plurality of commands from the host to the memory system; based on said monitoring, determining the time between the commands; and optimizing by the controller of the delay value based on the time between the commands.

Various aspects, advantages, features and embodiments of the present invention are included in the following description of exemplary examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

BRIEF DESCRIPTION OF THE DRAWINGS

FIG. 1 illustrates a system in which a non-volatile memory card is utilized.

FIG. 2 shows the pin assignments of an example card and system socket in which the card is inserted.

DESCRIPTION OF SPECIFIC EMBODIMENTS

Figure 3:
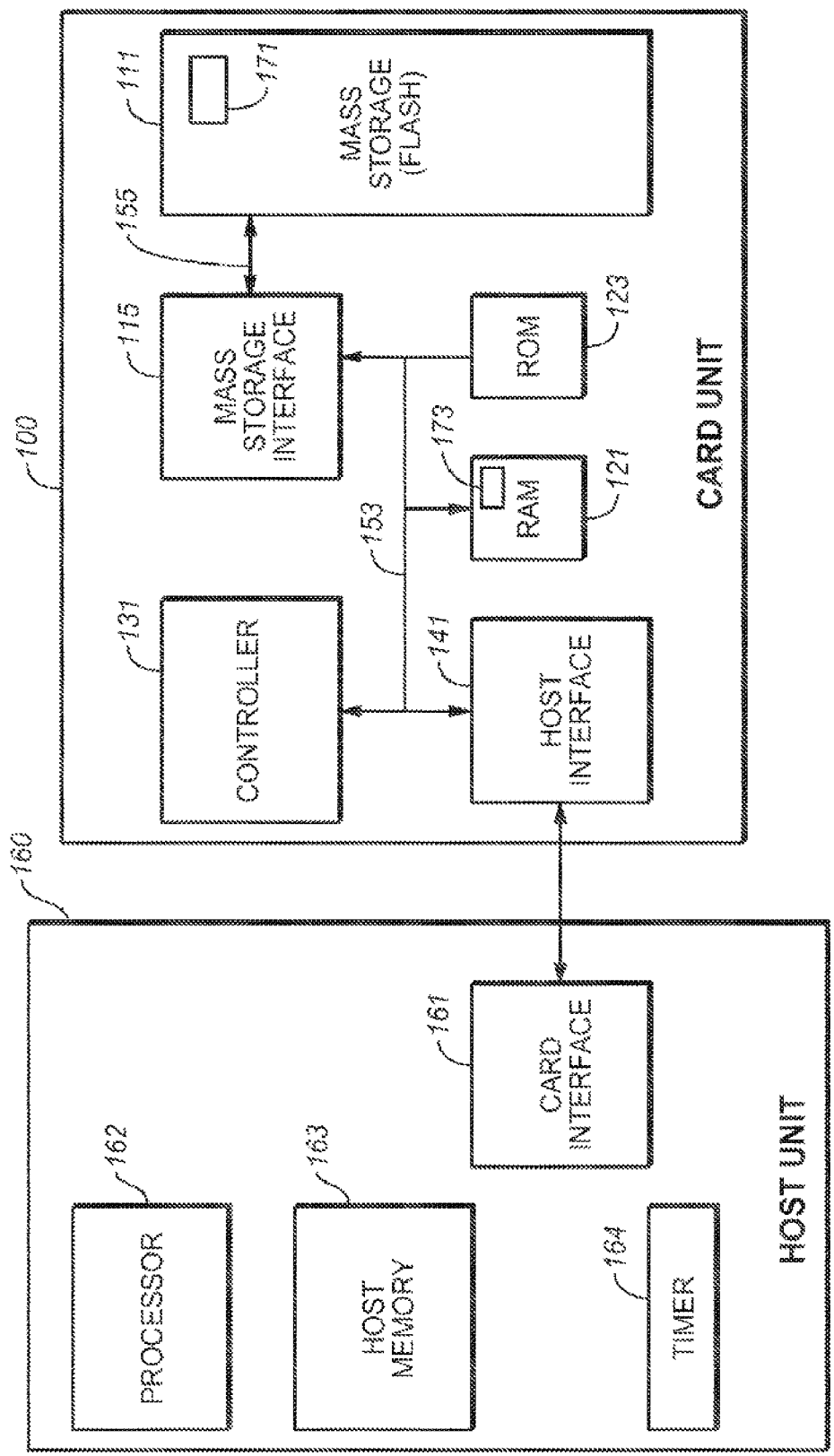
FIG. 3 is a block diagram showing more detail of an exemplary host-card system.

With reference to FIG. 1, a host electronic system 31 is illustrated to include a socket 33 into which one or more types of commercially available removable electronic circuit card 35, such as the memory cards summarized in the Background above, may be inserted and removed by the user. The socket 33 may be built into the host 31 or physically separate and connected by a cable or cableless means. The host 31 may be a personal computer, in desktop or notebook form, which includes the socket 33 that receives such a card. Other examples of host systems containing such a card socket include various portable electronic devices, such as hand held computers, personal organizers, other personal digital assistants ("PDAs"), cellular telephones, music players, and the like. Additionally, auto radios and global position system ("GPS") receivers also can have such a memory card socket. The improvements of the present invention have application to a wide variety of host systems that include a memory card socket or to which an appropriate adaptor or connector may attach a memory card.

In most of the examples described herein, the SD card is described but it will be understood that the invention is not limited to implementation with any specific type of removable electronic circuit card. In FIG. 2, the physical configuration of a SD card 35 and a mating socket 33 are shown. The SD card is rectangular in shape, having dimensions of 24 millimeters by 32 millimeters, with a thickness of 2.1 millimeters and narrow rails (not shown in FIG. 2) along the longer sides of the card that are 1.4 millimeters thick. The present invention may be implemented with a card having one of a wide variety of sizes but has a high degree of usefulness with cards that are 51 millimeters or less in length, 40 millimeters in width and 3 millimeters in thickness.

The SD card 35 contains nine surface electrical contacts 10-18. Contacts 13, 14 and 16 are connected to power ($V_{SS}$, $V_{DD}$ and $V_{SS2}$) when inserted into the host system socket 33. Card contact 15 receives a clock signal (CLK) from the host. Contact 12 receives commands (CMD) from the host and sends responses and status signals back to the host. The remaining contacts 10, 11, 17 and 18 (DAT 2, DAT 3, DAT 0 and DAT 1, respectively) receive data in parallel for storage in its non-volatile memory and send data to the host in parallel from the memory. A fewer number of data contacts are selectable for use, such as a single data contact 17. The maximum rate of data transfer between the host and the card is limited by the number of parallel data paths that are used. The MMC card described in the Background above has a similar contact layout and interface, but omits the data pins 10 and 18 and does not use the contact 11, which is provided as a spare. The MMC card has the same dimensions and operates similarly to the SD card except that the card is only 1.4 millimeters thick and has a single data contact 17. The contacts of the card 35 are connected through respective pins 20-28 of the socket 33 to its host system. Other extensions of memory cards that are compatible with the present invention are described in U.S. patent application Ser. No. 09/924,185 filed Aug. 2, 2001, which is hereby incorporated by reference.

The exemplary embodiment of the present invention is based on removable electronic circuit card, structured such as that shown in FIG. 3. FIG. 3 shows a conventional system having data processed by the host unit and then transmitted to the PC card for storage. As shown in the figure, the system comprises two units: a host unit 160 and a card unit 100, for example a standard MultiMediaCard or SD card. Generally, the host unit can be a consumer apparatus such as a cellular phone, a PDA, a Palm Pilot, or a personal computer. The host unit 160 comprises a processor 162 and other supporting components, such as a host memory 163, a timer 164, and a number of other standard elements not shown here. Furthermore, the host unit further comprises a card interface 161 for communicating with the card unit 100. The host interface 161 can be implemented using any of the above-mentioned protocols defined by the various manufacturers or associations.

As shown in more detail in FIG. 3, the card unit 100 generally comprises a host interface 141, memory storage and, in some cases, an on-card micro-controller. For the example shown, the host interface 141 of the card unit is used for communicating with the host unit 160. The on-card micro-controller 131 is used to control the loading of data from the host unit to the memory storage. In addition, the controller is designed for handling memory functions such as addressing and buffering. The controller 131 and host interface 141 are connected to the card bus 153, to which may also be connected some non-programmable ROM memory 123 for program storage and a RAM memory 121, usually volatile, that can act as a cache, as described for example in U.S. Pat. Nos. 5,418,752 and 5,172,338, which are both hereby incorporated by this reference. The mass storage memory 111, that will be FLASH memory on a MultiMediaCard or SD card, is not connected directly to the bus 153, but is instead connected through 155 to mass storage interface 115, which is in turn connected to bus 153. The mass storage interface 115 serves as a "non-linear" or "non-random" access interface for controlling the FLASH memory where data is stored in a non-linear fashion.

Memory cards are used in a wide variety of applications storing different types of data that have different requirements. These include audio, video, digital camera, data capture, error free applications (e.g., medical data) and so on. Although current storage systems are designed in a general manner to work in a number of different applications, such as audio storage, still image storage and video storage, they may operate well in one application but fail to provide fully acceptable performance in another application.

The present invention provides for a variety of cards that may be optimized for a single application or several different applications. For example, an audio-optimized card would "sense" when it is used in an audio device, such as an MP3 player, and know that it will need to maintain a certain data rate output, but may not be required to write data often. Given such information, the controller of the card can periodically output data, and during the dead times performs housekeeping functions and/or go into low power mode. Similarly, a video-optimized card can be developed that could either "sense" it is being used in a video application or, alternatively, the host can inform the card of the fact. A video-optimized card will take other information passed from the host into account, such as: record data rate(s), play back data rate(s), format, compression, quality criteria, sound criteria and other information related to video-applications. Knowing these factors will allow the card to perform optimally for the video-application.

For example, some applications can tolerate more error than others. Such applications, such as a fax or some video applications where single pixel errors are not that noticeable, would not require completely lossless ECC. The memory device can poll the host system to determine whether such a lossy scheme is acceptable. Another example where the loss of a few bits in a sector is not critical is the playing of a coded voice that is saved on a memory card because the decoding can be compensated by the interpolation that is done on data, with each coder/decoder can define its threshold number. On the other hand, more intensive ECC can be performed in applications where data integrity is essential (e.g. medical applications). In this case, the memory device employs more complicated ECC at the cost of performance. Such variable ECC or quality of service ECC is one example of card adapting to the host. Although this may be determined based upon polling the host, the card may also adapt to the host based on the card profiling the host.

In a host profiling arrangement, the non-volatile memory system profiles the host system with which it is used in order to determine the most efficient method of communicating with the host system. The host system of the non-volatile memory system provides feedback to the card to exchange information about a number of criteria. This information could include the type of drivers installed on the host and statistics related to those types of drivers, such as whether they are for video, audio, still images, and so on. It could also include the maximum and minimum clock rates or information about the buffer in the host device (whether the host wants to use the buffer or not) or the buffer in non-volatile system (whether the host wants to use the buffer on the non-volatile system). Based upon the profile of the host established by the card, the card can optimize itself accordingly.

As an example, consider the case where the card would optimize itself based on the frequency of host reads and writes for a card used in an MP3 player. MP3 players do not write often, but they do read a lot, as opposed to cameras that write often and frequently down load to a PC or PDAs that both read and write frequently. Additionally, MP3 players read fairly regularly and not at great speed. Consequently, there is a lot of non-busy time during reads, as shown in FIG. 4.

Figure 4:
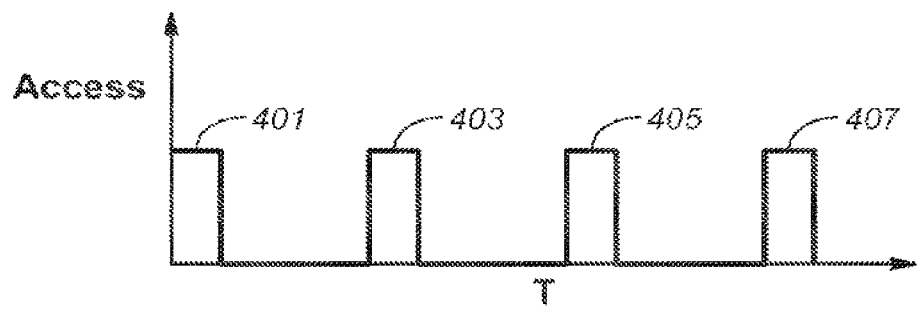
FIG. 4 illustrates an exemplary host access pattern.

FIG. 4 is a schematic representation of the access pattern of an MP3 player as a function of time, where data is read at 401, 403, 405, and so on, with the dead time between a pair of reads indicated at 411. During these dead times, the controller can go into a power saving mode, engage in defect management or various heroics to save marginal data, or fix bad bits or sectors as these non-busy times have a fairly regular occurrence and duration. Similarly, the profiling information of the host can give the card the ability to decide what are the best operations to do for the best performance of timings, quality, power consumption, and so on.

In any of these host-profiling methods, the card controller will identify the host access profile to optimize its algorithms. In addition to a memory array 111 (FIG. 3), the card will include a processor-based controller 131 that performs as the memory control. Although the memory can be based on other technologies, the exemplary embodiment will again be based on a flash memory.

As noted, these cards are designed to be plugged into different devices, such as PDAs, digital cameras, cell phones, and so on, which access the card in different patterns. In the prior art, this differentiation in function causes the card a hit in performance and in the capability to optimize the memory management algorithms according to the host access pattern as the prior art lacks the algorithm optimization aspect of the present invention. The different hosts use different applications with the memory cards. These applications have different needs in terms of read/ write performance, level of data integrity, etc. that is not taken into account in the prior art card controllers. The host profiling aspect of the present invention improves upon the prior art by having two modes of operation. In the first of these, the host profiling is by the card controller. The second is based on a quality of service negotiation between the card and the host. These operations will allow the card controller to tune its algorithms according to the data collected on the host. The various embodiments can be implemented in hardware or firmware.

In the mode where the host profiling is performed by the card controller, the card will learn about the host during its transactions and will collect information, such as write/read buffer transfer speed, the idle time between data buffers, block count in read/write, LBA rewrites, file access table (FAT) updates, idle time between sequential commands, and so on. The card will then use this information to optimize the memory control algorithms to the host. For example, on a host that reads slowly, such as an MP3 player, the card can handle correctable ECC errors by having the card controller read ahead enough sectors that will allow a safe correction in the flash memory without a degradation in performance. In another example, if the card recognizes rewrites to the file access table, it can have FAT data caching in the card and update these sectors less frequently.

A first example of host profiling by the card's controller is the profiling of the clock rate used on the card's system bus, for example the SD or MMC bus as described in the references incorporated above for these cards. In this example, the card's hardware can include a counter that will be incremented on every system bus clock. Such a counter 133 is shown in FIG. 3 as part of the controller. As the system's firmware knows the system's clock rate that the controller is running, a simple calculation allows the controller to determine the bus clock. In another example, the card's firmware can activate a timer to measure how long it takes the card to receive from or send to the host a specified number of sectors. This number could be any number (2, 4, 8, 16, and so on) and can be a settable parameter in firmware.

In a further example, the card can set its system clock (or clocks) to meet the host's transfer rate and minimize power consumption. As the higher the clock rate, the greater the power consumption of the card's controller, the controller's system clock(s) have a major impact over the card's power consumption. If the card system maintains a clock rate faster than needed to conform with the host's transfer rate, unnecessary power will be consumed, so by setting the system clock settings to meet the host transfer rate, the card optimizes its power consumption while maintaining performance. The card's firmware can hold a table to indicate the card's data transfer rate for a given clock setting. Once the card's profiling has determined the host's transfer rate, it can then use the minimum clock rates that allow the card to successfully supply the host's data transfer rate. This will allow the card's power consumption to be optimized. The firmware can continue to monitor the host's data transfer rate and update the controller's clock(s) setting(s) accordingly.

In another set of examples, the card can profile a host's block count for both read and write. Again referring to the SD and MMC cards as the exemplary embodiment, the write and read commands do not have a defined block count and the termination of an operation is based on a stop transmission command. In a first instance, during a reset process, such as power on, the card's firmware can determine whether an access by the host is to the file system area instead of the user data area. At reset, the firmware can read assigned area where the Master Boot Record (MBR) is stored, such as Logical Block Address (LBA) 0. If the master boot record is a file system sector, the firmware can find the LBA range of the file system, such as (MBR+Partition Table+FAT1+FAT2) in the MMC/SD card example, where FAT1 and FAT2 are the two copies of the file access table. Once the LBA range of the file system determined, any access to this address space by the host can be considered as access to file system area and not to user area.

In a second instance, the firmware can find the block count used by the host to write data to the user space during write or read operations and the sequence of starting LBAs. Once the card's firmware has determined the block count that the host uses and the sequence of starting LBAs, it can tune its algorithms and hardware to maximize performance and minimize power consumption. Examples of such tuning can include data caching, prioritizing tasks/interrupt service routines/direct memory accesses, determine garbage collection (data relocation) preferences (such as least recently used or most recently used blocks), and so on. In systems having multiple Direct Memory Access (DMA) and Interrupt Service Routine (ISR) operations, the priority order chosen can have a major impact on performance.

In the quality of service mode, the host requests the card report its capabilities and recommendation. The host will report to the card the configuration it prefers to work with and its profile for accessing the card. The card capabilities reported to the host can include: read/write speed, best write block count, best start logical block address (LBA) alignment, ECC capabilities correct/ignore/abort, performance versus current consumption, performance versus data retention, and other operating parameters. There are usually a number of trade offs between these in card design, and this process allows these parameters to be adapted to the particular application. The host profile reported to the card can include: write/read maximum speed; logical address offsets for data types (for example, the offset in number of blocks for user data with a start LBA and block count due to overhead, such as (blocks devoted to list of transactions+ start LBA+block count) or (blocks devoted to FAT area−start LBA+block count); the level of data integrity in acceptable in a read (for example, ECC errors can be corrected or can be ignored and the read continued; alternately, a bad block can be set to some pattern or the read can be aborted); and so on. All of the features described above for the host-profiling mode can also be implemented in the quality of service mode and vice versa. Additionally, it should be noted that these two modes are not exclusive of each other and be used in a complimentary manner.

As an example of the quality of service mode, if the card knows the memory area storing FATs, it can use a different algorithm to write to these FAT blocks to minimize garbage collections. In another example, if a host, such as a PC, requires high performance and has a high power supply, the card can choose a high performance/high power consumption mode, such as using multiple plane or multi-chip programming (described in U.S. patent application Ser. No. 10/315,451, filed Dec. 9, 2002, which is hereby incorporated by reference); on the other hand, in a low power host, such as an MP3 player, the card can choose low performance and low power operation.

If the controller has the ability to adjust its own internal clock frequency such as by writing a value to a defined hardware register, the controller performance can be adjusted to meet that required by the application and can even be varied depending on external conditions. For example, in a high performance application, a maximum frequency may be desirable at the expense of increased power consumption, and an intelligent controller can measure suitable external variables such as temperature or power supply voltage and adjust the clock frequency accordingly. It is common to design an internal oscillator to be relatively constant with respect to temperature and voltage. However, CMOS circuits are normally capable of higher speed operation at lower temperatures and at higher voltages. The chip temperature can be measured, such as through the use of a temperature sensitive resistor or p-n junction, and the frequency set accordingly. Similarly the external voltage is easily measured using well know analog to digital converter circuitry and the internal oscillator frequency adjusted in response to this measurement. In this manner the application can override the normally pre-set clock frequency and obtain maximum performance under a variety of application and environmental condition.

Figure 5:
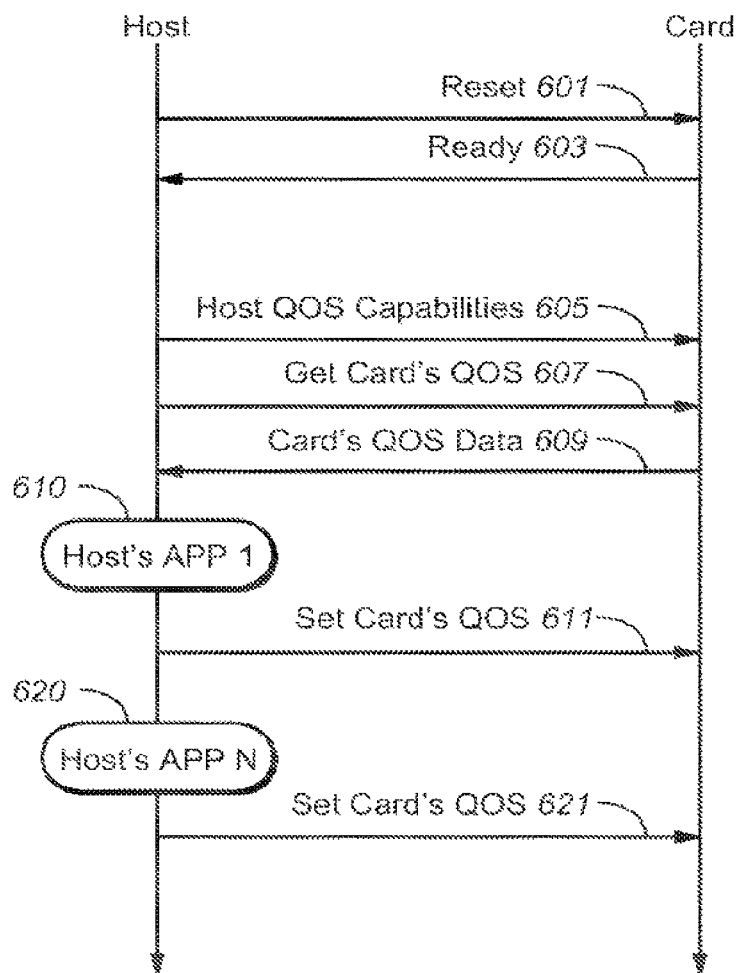
FIG. 5 describes an exemplary quality of service negotiation.

FIG. 5 is a diagrammatic illustration of an exemplary host-card quality of service negotiation process showing the exchanges that allow the card to choose the quality of service optimized for a given application. After the card is connected to a host, the host sends the card a reset signal 601. The reset signal in an MMC card embodiment is described further in U.S. patent application Ser. No. 09/186,064 incorporated above, where the ability of the card to select the host's protocol based upon the reset signal is described. The card responds with a ready signal 603. At this point the actually quality of service (QOS) negotiation begins, with the host sending its QOS capability data to the card 605 and requesting the cards QOS capabilities 607, where the order of these steps can be switched depending on the implementation. The card responds to the host with the card's QOS data 609. At this point, the host can put the card use in an application.

After the QOS negotiation between the host and the card, the host can set the card's configuration according to the host applications' needs. For instance, an MP3 application may require only require a low bit rate and low power, while an image-capture application may require the maintaining high bit rate, and so on. For example, to use the card in a first application APP 1 610, the host sets the card's QOS 611 optimized for the application: for example, it could be an application were the rate and consistency of data transfer is more important that minor amounts of error. In this case, the use of ECC could be used only in as much as it does not affect the transfer rate. At a subsequent time, the host can use the card in another application APP N 620 and resets the card's QOS 621 accordingly: For example, application APP N could require data, such as in medical imaging, to be stored at with highest integrity with speed of far less importance.

All of these embodiments have the card learning host profile in real time and tuning the memory management algorithms according the collected information for achieving the best performance. They also differ from the prior art in that the host and card negotiate over capabilities and the card sets the card operating algorithms according to the best configuration.

Figure 6:
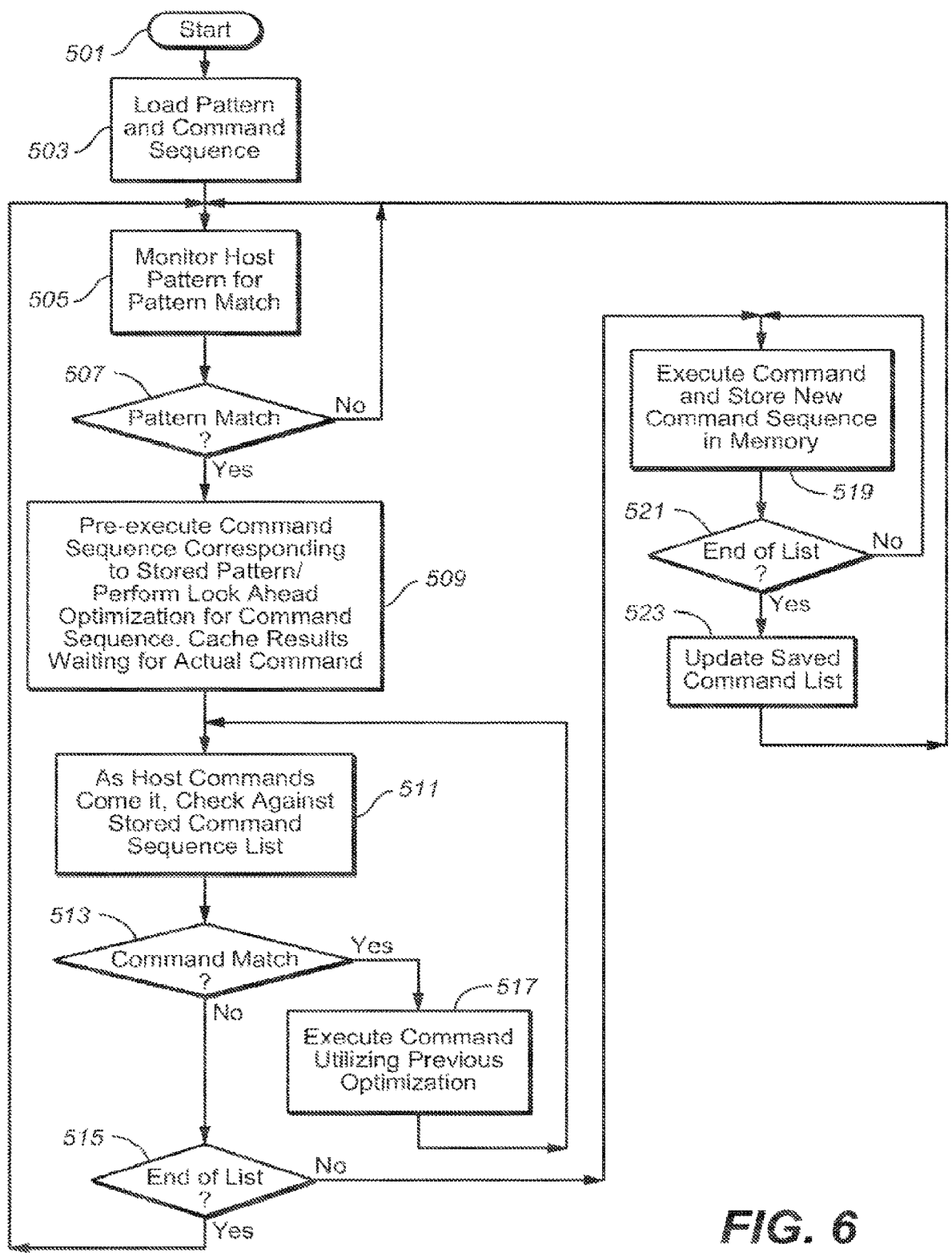
FIG. 6 is a flow chart of an exemplary embodiment.

A particular implementation of the invention based on dynamic optimization through pattern recognition is described with respect to FIG. 6. The exemplary embodiment of FIG. 6 allows the performance of storage devices to be optimized without having to analyze an overly large number of applications by allowing the storage device to dynamically self-optimize by monitoring for specific and typical patterns of host behavior. This improves upon prior art techniques, such as caching and other general performance enhancements. Although this implementation is again discussed in the context of a flash based non-volatile memory card, as are the various aspects and implementations discussed above, these concepts may be applied to other storage devices, such as in the optimization of dual storage devices such as a disk drive with flash memory device.

The techniques of the embodiment of FIG. 6 allow a storage device to memorize access sequences issued by the host under certain predefined conditions, such as host reset, power on boot sequence, various benchmarks and so on. The underlying concept is that when these predefined condition or "trigger patterns" occur, the sequence of host commands that follow them is usually identical. It should be noted that this matching is based on pattern matching, rather some sort of code matching mechanism. The storage device can use this information to optimize operation for those expected commands. Optimization could be by performing look ahead read caching to pre-fetch data, or other system type preparation that would speed up command execution. For example, when a host issues a reset, the portion of the memory storing the file access tables are most likely read first, so the card could use this as a trigger. On deviation from expected command or control sequence, the device would memorize the new command sequence and save to permanent storage thus becoming self-adaptive. Similarly, if an already stored pattern is changed, the stored pattern is updated to reflect the variation or extension of the pattern. Several different patterns and command sequences may be stored.

Referring to FIG. 6, the process starts at 501 with the card connected to the host and at step 503 any initial or additional set of patterns and command sequences are loaded onto the card. When used with a blank card, a number of such patterns may be predefined in firmware, although these need not be complete patterns. As the implementation is dynamically self-optimizing, the card itself can complete the process, thereby saving on initial engineering time. Typical patterns could include command sequences and single commands, reset, power cycle, and so on. During operation, the card will monitor the host-card interactions at step 505, seeing whether a match occurs with any of the stored patterns. This continues (the "No" loop from 507) until a match is detected at step 507, when it moves to step 509.

When a pattern matches the initial portion of a stored command sequence, the card can pre-execute the command sequence corresponding to pattern, as shown at step 509. The actual action taken may depend upon implementation and may be actions in preparation for the command or the actual execution of the command, such as a read operation to fill a cache or doing a seek to an expected location in the memory, preloading control information or tables, or performing logical to physical address translations. Controller 131 (FIG. 3) would handle the processing involved in these processes. As the host commands continue to come in, the card will check the command against the stored command sequence list (step 511) and determine (step 513) if the command previously selected as matching in step 507 based upon its initial portion continues to correspond. If so, the command will be executed in step 517 using the previous optimization. If not, nothing is lost and the process goes to step 515 where the card determines if the end of the list has been reached and, if so, to return to monitoring the host at step 505. Note that for the case where the entries of the list have an order, such a series of logical block addresses to read, it can be determined that the command does not match a list entry without having to exhaust the list.

If step 515 finds that it is not the end of the list, the flow continues to step 519 for the dynamic updating portion of the process. In step 519, the command is executed and the new sequence is stored in the memory, such as RAM 121 of FIG. 3, so that it can be saved to the command list when it is updated. It the list has not been previously exhausted, this process continues (the "No" loop from 521) until the end of the list is reached, as determined in step 521, at which point the list of saved commands is updated (step 523). For example, if the signature access of a benchmark changes so that its later portion is different than the previous value (say, switching a logical address to be read), this would be covered in the updating by revising this portion of the benchmark sequence. Once the updating is complete, the process returns to step 505 and monitors the host.

For example, consider the case where a non-volatile memory is organized into a series of "zones", such as is described in U.S. patent application Ser. No. 10/315,451 filed Dec. 9, 2002, which is hereby incorporated by reference. In this arrangement, various data used as part of the boot process, such as the file access table (FAT), is stored in a specific area, which can be taken as part of zone 0. When initially accessing a given zone, there is an initial process of logging in to that zone. For example, there may be initial header data associated with each zone that needs to be read (logical to physical conversions, remapping, etc.) and processed before the actual data content is retrieved. By performing this login ahead of time and pre-fetching any likely data, this time is saved if the sequence is as expected, and nothing is lost if it turns out to be different.

Figure 7:
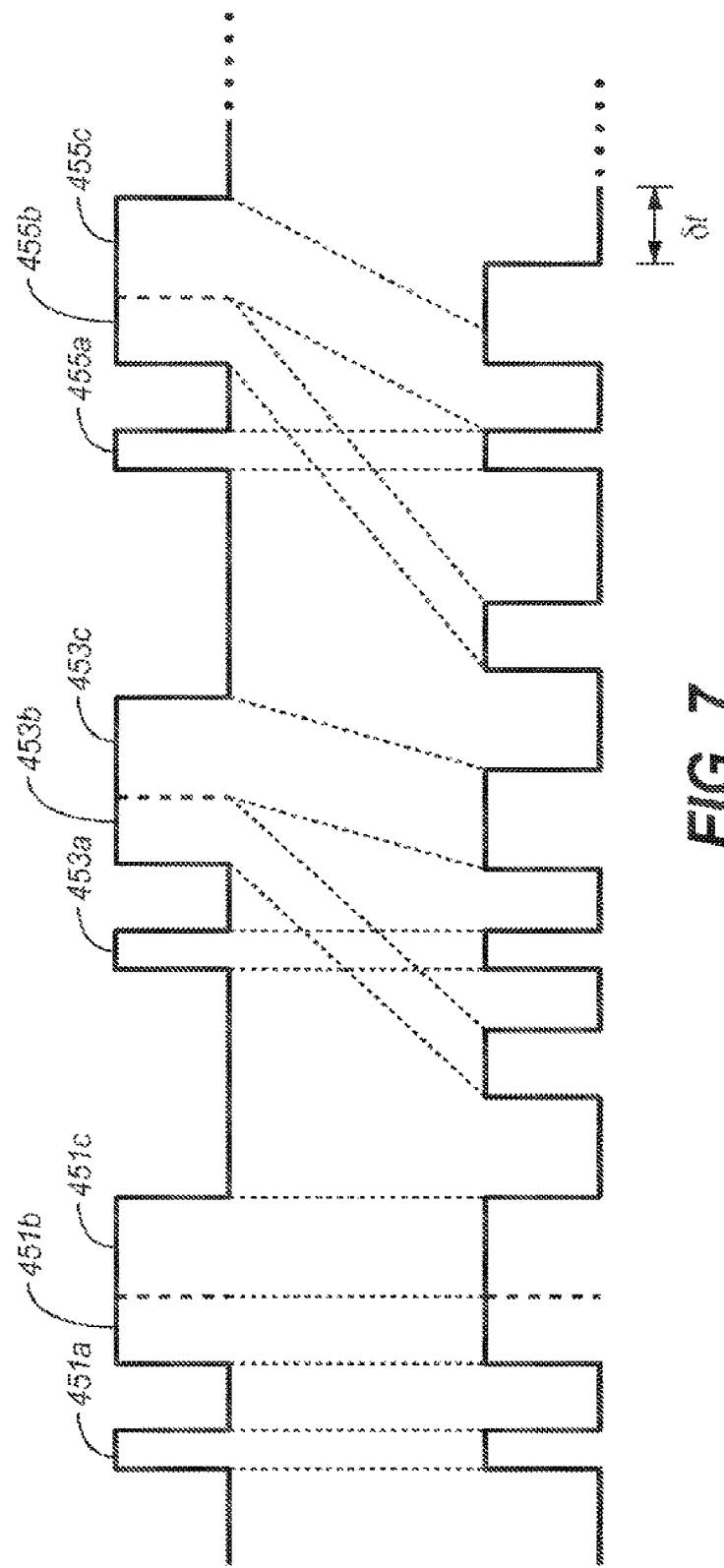
FIG. 7 illustrates an exemplary host access pattern and how access time can be reduced.

FIG. 7 can used be to illustrate this situation, where the top row illustrates the prior art process and the bottom row shows how this would be changed from the prior art. The top row of FIG. 7 is similar to FIG. 4, but with additional detail. The controller receives a command or control sequence (451*a*, 453*a*, 455*a*, . . . ) and responds. Each response consists of a corresponding preparation portion (451*b*, 453*b*, 455*b*, . . . ) and operation portion (451*c*, 453*c*, 455*c*, . . . ). In the prior art, the controller will wait for the command, such as 453*a*, before executing the corresponding preparation and operation, 453*b* and 453*c*. In the present invention, once the initial portion of the command or control sequence matches one of the trigger patterns, the subsequent preparation portions can be moved into the dead time ahead of the next command, as is shown in the bottom row of FIG. 7.

In the bottom row of FIG. 7, the controller finds a match in the control signal 451*a*. As it had not previously established this as matching a stored pattern, the corresponding preparation and operation phases (451*b*, 451*c*) are executed afterwards; however, the preparation for the expected next command (453*b*), such as caching data or a seek, is also executed prior to the arrival of the corresponding signal 453*a* at the controller. If the signal 453*a* continues to match the pattern, the preparation phase is already completed and the controller proceeds directly to the operation 453*c*. (If 453*a* is not a match, the correction preparation phase would be performed as in the top row and nothing is lost and the stored sequence can be subsequently updated) The process continues similarly for the set 455*a-c* and so on for the rest of the control sequence. This results in the hiding the preparation time for each part of the sequence after the first where the pattern is matched. For example, through 455*c* in FIG. 7, the process has the resultant time saving of $\delta t$ due to pre-executing the "b" portions of the commands.

For example, consider a boot process, where zone 0 is most likely to be accessed (to retrieve the FAT), followed by, say, zone 5 and then zone 1. Based on the initial portion of the sequence, during the dead time after accessing zone 0, the controller may as well login to zone 5 and be ready. If 451, 453, and 455 respectively correspond to the respective combined access times for zones 0, 5, and 1 in the exemplary process, by moving the login and pre-fetch time (453*b* in FIG. 7) into the preceding dead time, the access time needed for zone 5 is correspondingly reduced, with similar savings available in the other access times. If the sequence of commands does not go to the expected zone 5, as this login was performed during an idle time, nothing is lost. Additionally, if the boot process changes, from, say, the exemplary 0-5-1 to 0-5-3, or is extended, to, say, 0-5-1-4, this will be dynamically updated.

The dynamic optimization through pattern recognition described with respect to FIG. 6 can either be left functioning once the memory system is shipped and in the field, allowing for continued optimization during use by the consumer, or be used prior to shipping and then fixed. In the prior art, the standard method of optimizing a card at the factory for a specific application or set of applications required a study of the hosts' access patterns. Once these had been analyzed, the cards' firmware was tuned accordingly. In contrast, the present invention allows the storage device itself to learn. The storage device can start with only a few partial patterns, or no patterns, stored on the device. The card can then be run through a number of applications, such as benchmark utilities or boot sequences, and the corresponding patterns learned and stored. At this point, the learned processes could be fixed if desired and the product shipped.

Although the discussion so far has considered the adaptation of a removable electronic circuit card to host behavior, more generally the controller can adapt to the card to other external conditions. For example, it is known that the performance of flash memories, such as those found in the exemplary embodiments above, degrades when operated at extreme temperatures. Further such examples of conditions external to the memory card that may affect card operation are when the battery is low on host device. As noted above, chip temperature can be measured, such as through the use of a temperature sensitive resistor or p-n junction, and the frequency set accordingly. Similarly the external voltage is easily measured using well know analog to digital converter circuitry and the internal oscillator frequency adjusted in response to this measurement. In this manner the application can override the normally pre-set clock frequency and obtain adjust performance to a variety of external conditions.

When the controller senses any of these additional conditions that may adversely affect performance, the controller could operate the memory in a more reliable manner. This could be done in various ways similar to those already described, such as lowering performance, increased use of ECC or margining, and so on. The sensing of such conditions can be accomplished using reference cells in the memory or other techniques, such as described in U.S. Pat. No. 5,694,356, which is hereby incorporated by reference. The particular conditions to which the controller responds, and how it does so, would correspond to the memory technologies (e.g. thin film, MRAM, FRAM, NMOS, etc.) employed.

The forgoing examples memory systems have been based on flash EEPROM memory cells have been described with respect to the type of cell that utilizes conductive floating gates as charge storage elements. However, the various aspects of the present invention can be used in conjunction with the various alternate non-volatile memory technologies (such as thin film, MRAM, FRAM, NMOS, etc.) described in U.S. patent application Ser. No. 10/841,379 filed May 7, 2004, which is hereby incorporated by reference. For example, the invention may also be implemented in a system that uses a charge trapping dielectric as the storage elements in individual memory cells in place of floating gates. Dielectric storage elements are also discussed further in the U.S. patent application Ser. No. 10/280,352, filed Oct. 25, 2002, which is hereby incorporated by this reference.

The forgoing material is developed more thoroughly in U.S. Pat. Nos. 7,427,027, 7,926,720, and US patent publication number US-2011-0167186-A1.

Go to Sleep Device Adaptation

This section considers embodiments related to when the non-volatile memory device goes into a low-power standby, or sleep, mode. Between commands, the device controller may go to sleep in order to save standby power consumption. For example, the controller may same power by one or more of turning off a clock or oscillator on the device, turning off power to the memory section, turning off power to one or more areas of the controller (such as RAM blocks), and so on. Although the being in the sleep mode saves power, returning the device to the normal operational mode ("waking the device") upon receiving a new command is both time and power consuming. Although the specifics depend on the scope of the low-power standby mode, waking the device will negatively affect device performance, especially performance for more random host accesses of the device. Consequently, it would help to optimize performance if go to sleep behavior of the memory device better matched the access behavior the host. This section considers mechanisms that help minimize the occurrences of switching between modes and, consequently, minimize the performance impact and the current consumption by increasing the correlation of these mode changes to the host's access timing.

In the typical prior art, if the memory device has a sleep mode, the design would use a fixed time delay (of some number of micro- or milliseconds, for instance) before lapsing into a low power standby mode. This means that there will be no performance impact due to returning to the regular operational mode if the host sends commands more frequently than the device delay. A disadvantage of this arrangement is that it does not cover host command timings (from the previous command termination) that are greater than the device delay, resulting in a too frequent lapsing into sleep mode; and, conversely, when the typical host command timing is less that the device delay, the memory system will tend to wait too long before lapsing into the sleep mode. This situation can be aggravated for the case running different applications that use different command timings.

A first set of embodiments uses a command between the host and the memory device to set the device's low-power standby mode switch delay (or go-to-sleep delay, STSD). The setting can be per operation or for any command. For instance, if the host is slower in accessing the device upon a set of write commands compared with a set of read commands, the host can define different values for the sleep delays of writes and reads.

The command format can be:

Set Low_Power_Standby_Mode_Switch_Delay (Operation Type, Delay Time, Attribute) The Operation Type field specifies the types of commands to which the delay applies, such read, write, erase, boot, and so on. The Delay Time filed specifies the go-to-sleep delay number in, for example, microseconds. An Attribute field can be included to specify that delay is permanent or volatile:

Attribute—PERMANENT: This setting will be used as default after power cycle
OLATILE: This setting is used for the current power session The controller can keep the delay value or values in its RAM 121 (FIG. 3) or other volatile register memory. An initial or default delay value (or values for differing operation types) can be kept in non-volatile memory, such as in control data kept in the non-volatile mass storage 111, where the PERMANENT designation would cause the corresponding current default value to be updated. While a VOLATILE designation would update the value in RAM 121 only, the PERMANENT designation would update both the value in RAM and that stored in non-volatile memory.

According to a second set of aspects, in some embodiments the low power standby mode switch delay (GTSD) is set in the memory system's parameter file that holds various operational parameters used by the controller during the operation of the memory system. The values initially in the parameter file 171 (FIG. 3) will be the default values, residing in the non-volatile memory 111, and copied into a portion 173 of the volatile RAM 121 at initialization rime. The host can then change these values at any time, as described above.

In a complementary set of embodiments, the device monitors the host delay time automatically, acting as a learning system. Based on this monitoring, the controller can adjust the delay values to optimize the memory systems algorithms for going to sleep with respect to the host's behavior. In an exemplary embodiment, the input values are:
Default GTSD value—Initial GTSD value after power up from parameter file or host
Maximum GTSD value—Maximum GTSD value from parameter file or host The variables used are:
Current GTSD (C-GTSD) value After power up this variable equals the default GTSD value and then the value changes after each command as described below with respect to FIG. 8.

Figure 8:
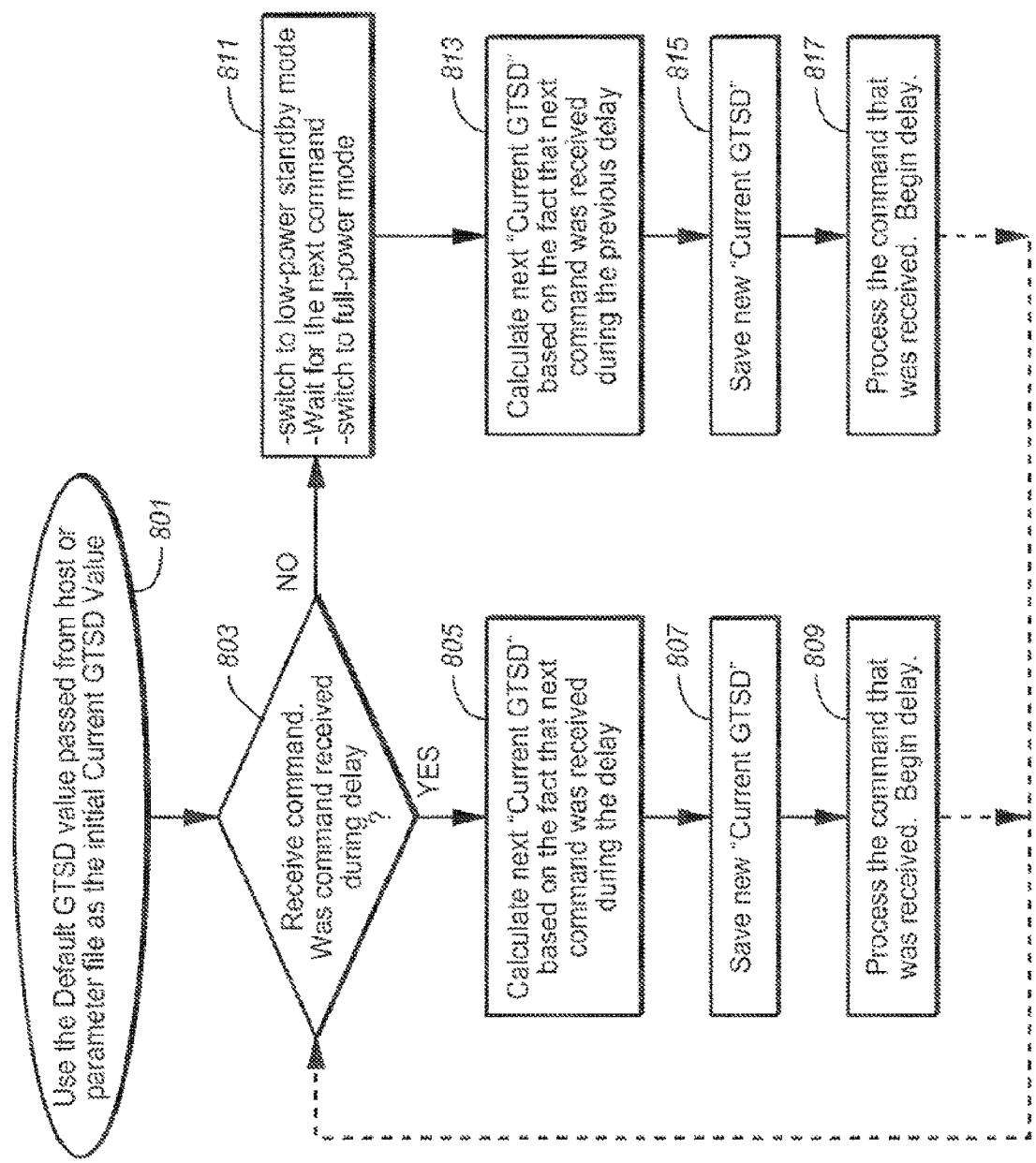
FIG. 8 is a flowchart of an exemplary embodiment where the memory device monitors the host delay time and adjusts go-to-sleep delay values accordingly.

FIG. 8 is an exemplary flowchart for the process. Initially, the default delay (GTSD value), as passed form the host or parameter file, is used as the current GTSD (C-GTSD) value (801). When a command ends, the system is delayed by the time value in C-GTSD before it lapses into the low-power standby mode. The next command can arrive before the system is switched to low-power standby mode or when it is already in this mode. At 803 a command is received and the path taken is determined by whether or not the command came during the delay period or after the device has gone to sleep. This can be from 801 if just after initialization or on the loop back from 809 or 817.

If the next command arrives before the system is switched to low-power standby mode ("YES" path out of 803), the new C-GTSD value is calculated (805) based on this fact. This can be done by an algorithm based on the current C-GTSD value and the amount of time after the preceding command when the next command arrived (TNC). (If this is the first command after initialization, the time since initialization can be used as the TNC value or this step can be skipped for this first command.) For example, one sample algorithm is:

$$C\text{-}GTSD = (C\text{-}GTSD + TNC)/2$$

In this example, the average of the two values is used, but more generally other intermediate values can be used, and can be a settable parameter for the system or dynamically determined by the controller. Also, more complicated algorithms may be used that are based more than one TNC value, although this will require more storing more data and more involved computations.

This new value is then saved (807) as the current GTSD value and received command is processed (809). At 807, the current delay (C-GTSD) is stored in RAM and, depending on the embodiment, stored in non-volatile memory as the new default value, much as described above for the host command based embodiment. Although shown as occurring sequentially in the order 805-807-809, the order can be arranged, including having these steps overlap. After processing the command and 809, the memory system then loops back to 803 and waits until the next command comes in.

If the next command arrives when the system is already in low-power standby mode ("NO" path out of 803), the memory system will have switched to the low-power standby mode while waiting for the next command, at which point it will revert to the full power, regular mode (811). The new C-GTSD value can be calculated (813) by an algorithm based on the current C-GTSD and the maximum GTSD (M-GTSD) value, increasing it from the current values part way toward the maximum. One example for an algorithm is:

$$C\text{-}GTSD = +C\text{-}GTSD + (M\text{-}GTSD - C\text{-}GTSD)/10$$

This adds some to the C_GTSD value, without taking it beyond the maximum. Other shifts besides a tenth could similarly be used, as long as it does not reach the maximum, and this fraction can be a settable parameter for the system or dynamically determined by the controller. As with 805, more complicated algorithms could also be used based more than one inter-command period. The process then proceeds on to 815 and 817, which are much as in 807 and 809 and for which similar comments apply.

The flow of FIG. 8 is similar to that for first embodiments discussed in this section, where the delay is set based on a host command, except that steps 805 and 813 reset the delay based upon the command, if the command specifies a delay as described above, and do nothing if the command does not specify a new delay value. As noted above, the command based embodiments are complimentary to the controller determined delays described with respect to FIG. 8: For example, if the device is operating according to an embodiment as in FIG. 8 and the received command is one specifying a delay time, then, in step 805 or 813, this value would override the value computed according to the algorithm.

Returning back to controller determined delay embodiment of FIG. 8, this uses an assumption that the intervals between commands correspond to the number and type of applications that are executed on the host. This typically means there are periods where the commands will be very frequent and other times when the time between commands will be longer. The exemplary algorithms are simply implemented and are aimed at changing the delay time before switching to the low-power standby mode, based on the last known command intervals. Here, it should be noted that if a command is received after the card has already lapsed into the low-power standby mode, the device will usually have no way to measure the amount of time passed until the command was received since the sleep mode usually involves shutting down any sort of clock or oscillator that could be used for this. The suggested algorithms allow the controller to optimize the memory system's power consumption in variable command timing environment.

CONCLUSION

For any of the described embodiments, these have the advantage of providing minimal low-power/regular mode switching overhead to gain maximum input/output operation rate for any host and any host application use case, whereas the previous approaches are based on a static solution to provide a fixed response for all hosts and applications The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

It is claimed:

1. A method for a data storage device, the method comprising:
    monitoring one or more commands from a host;
    controlling one or more memory devices for operation in a standard mode or in a standby mode, wherein in the standard mode, the one or more memory devices operate on commands, and wherein a power usage in the standby mode is lower than a power usage in the standard mode;
    responsive to completing a first command in the standard mode, switching the one or more memory devices from the standard mode to the standby mode after a delay period subsequent to completing the first command unless a second command is received before an end of the delay period;
    responsive to receiving the second command before the one or more memory devices enter into the standby mode: performing a first determination based on an amount of time passed to receive the second command; and decreasing a length of the delay period based on the first determination; and
    responsive to receiving the second command after the one or more memory devices are in the standby mode: performing a second determination; and increasing the length of the delay period based on the second determination,
    wherein:
    the second determination is performed using a summation computation that includes at least two operands, including a first operand and a second operand;
    the first operand uses a value of a current length of the delay period;
    the value of the current length of the delay period is a value of the length of the delay period prior to receiving the second command; and
    the second operand uses a value of a first duration without using an amount of time passed to receive the second command.

2. The method according to claim 1, wherein the second operand is based on a settable parameter.

3. The method according to claim 1, further comprising: responsive to receiving a command indicating a new time duration, resetting the length of the delay period to the new time duration without decreasing the length of the delay period based on the first determination and without increasing the length of the delay period based on the second determination.

4. The method according to claim 1, comprising: responsive to receiving a command from the host indicating a new time duration while in the standby mode, placing the one or more memory devices into the standard mode and subsequently executing the command indicating the new time duration.

5. The method according to claim 1, wherein:
when the second command is received prior to the end of the delay period, the one or more memory devices are not placed into the standby mode during the delay period; and
the first determination is performed based on a time interval between the first and second commands.

6. The method according to claim 1, wherein with respect to receiving the second command after the one or more memory devices being in the standby mode, the one or more memory devices are placed into the standby mode after the delay period but prior to receiving the second command.

7. The method according to claim 1, wherein decreasing the length of the delay period based on the first determination comprises decreasing the length of the delay period based on the length of the delay period prior to receiving the first command and a time between the first and second commands.

8. A data storage device, comprising:
one or more memory devices; and
a controller coupled to the one or more memory devices, wherein the controller is configured to cause:
controlling the one or more memory devices for operation in a standard mode or in a standby mode, wherein in the standard mode, the one or more memory devices are configured to operate on commands, and wherein a power usage in the standby mode is to be lower than a power usage in the standard mode;
responsive to completing a first command in the standard mode, switching the one or more memory devices from the standard mode to the standby mode after a delay period unless a second command is received before an end of the delay period;
responsive to receiving the second command before the one or more memory devices enter into the standby mode: performing a first determination; and decreasing a length of the delay period based on the first determination; and
responsive to receiving the second command after the one or more memory devices are in the standby mode: performing a second determination; and increasing the length of the delay period based on the second determination, and
wherein:
the controller is configured to cause performing the second determination using a summation computation that includes at least two operands, including a first operand and a second operand;
the first operand is to use a value of a current length of the delay period;
the value of the current length of the delay period is a value of the length of the delay period prior to receiving the second command; and
the second operand is to use a value of a first duration without using an amount of time passed to receive the second command.

9. The data storage device according to claim 8, wherein the second operand is based on a settable parameter.

10. The data storage device according to claim 8, wherein the controller is configured to cause: responsive to receiving a command indicating a new time duration, resetting the length of the delay period to the new time duration without decreasing the length of the delay period based on the first determination and without increasing the length of the delay period based on the second determination.

11. The data storage device according to claim 8, wherein the controller is configured to cause: responsive to receiving a command from a host indicating a new time duration while in the standby mode, placing the one or more memory devices into the standard mode and subsequently executing the command indicating the new time duration.

12. The data storage device according to claim 8, wherein the controller is configured to cause:
when the second command is received prior to the end of the delay period, not placing the one or more memory devices into the standby mode during the delay period; and
performing the first determination based on a time interval between the first and second commands.

13. The data storage device according to claim 8, wherein with respect to receiving the second command after the one or more memory devices being in the standby mode, the controller is configured to cause placing the one or more memory devices into the standby mode after the delay period but prior to receiving the second command.

14. The data storage device according to claim 8, wherein decreasing the length of the delay period based on the first determination comprises decreasing the length of the delay period based on the length of the delay period prior to receiving the first command and a time between the first and second commands.

15. The data storage device according to claim 10, wherein the command includes an attribute that specifies a type of command to which the new time duration applies.

16. The data storage device according to claim 8, wherein:
the data storage device is configured to cause, in the standby mode, turning off power to at least a portion of the controller;
the portion includes a clock circuit; and
the controller is configured to override a pre-set clock frequency.

17. The data storage device according to claim 8, wherein the length of the delay period associated with a write operation is different from the length of the delay period associated with a read operation.

18. An apparatus, comprising:
means for controlling one or more memory devices for operation in a standard mode or in a standby mode, wherein in the standard mode, the one or more memory devices are configured to operate on commands, and wherein a power usage in the standby mode is to be lower than a power usage in the standard mode;
means for switching, responsive to completing a first command in the standard mode, the one or more memory devices from the standard mode to the standby mode after a delay period subsequent to completing the first command unless a second command is received before an end of the delay period;
means for, responsive to receiving the second command before the one or more memory devices enter into the standby mode, performing a first determination based on an amount of time passed to receive the second command and decreasing a length of the delay period based on the first determination; and
means for, responsive to receiving the second command after the one or more memory devices are in the standby mode, performing a second determination and increasing the length of the delay period based on the second determination,
wherein:

the second determination is for being performed using a summation computation that includes at least two operands, including a first operand and a second operand;

the first operand is to use a value of a current length of the delay period;

the value of the current length of the delay period is a value of the length of the delay period prior to receiving the second command; and the second operand is to use a value of a first duration without using an amount of time passed to receive the second command.

19. The apparatus according to claim 18, wherein the second operand is based on a settable parameter.

20. The apparatus according to claim 18, comprising: means for placing, responsive to receiving a command from a host indicating a new time duration while in the standby mode, the one or more memory devices into the standard mode and subsequently executing the command indicating the new time duration.

* * * * *